US008868885B2

(12) United States Patent
Dekter et al.

(10) Patent No.: US 8,868,885 B2
(45) Date of Patent: Oct. 21, 2014

(54) ON-THE-FLY PERMUTATION OF VECTOR ELEMENTS FOR EXECUTING SUCCESSIVE ELEMENTAL INSTRUCTIONS

(75) Inventors: Yaakov Dekter, Tel-Aviv (IL); Michael Boukaya, Raanana (IL); Shai Shpigelblat, Ranaana (IL); Moshe Steinberg, Hof HaCarmel (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 781 days.

(21) Appl. No.: 12/949,265

(22) Filed: Nov. 18, 2010

(65) Prior Publication Data
US 2012/0131308 A1    May 24, 2012

(51) Int. Cl.
G06F 9/345   (2006.01)
G06F 15/80   (2006.01)
G06F 9/30    (2006.01)
G06F 9/38    (2006.01)

(52) U.S. Cl.
CPC ............ *G06F 9/345* (2013.01); *G06F 9/30036* (2013.01); *G06F 9/3826* (2013.01); *G06F 9/30032* (2013.01)
USPC .............. 712/7; 712/9; 712/300; 712/E9.039; 712/E9.071

(58) Field of Classification Search
None
See application file for complete search history.

(56) References Cited

U.S. PATENT DOCUMENTS

| | | | | |
|---|---|---|---|---|
| 4,775,952 | A * | 10/1988 | Danielsson et al. | 708/524 |
| 6,957,375 | B2 * | 10/2005 | Richardson | 714/752 |
| 7,814,303 | B2 * | 10/2010 | Muff et al. | 712/300 |
| 7,933,405 | B2 * | 4/2011 | Knowles et al. | 380/42 |

FOREIGN PATENT DOCUMENTS

WO   WO 2007/103195   9/2007

OTHER PUBLICATIONS

Gordon Cichon et al. "Synchronous Transfer Architecture (STA)" Lecture Notes in Computer Science, vol. 3133. pp. 193-207 & pp. 544-545 Jan. 1, 2004. Retrieved from the internet: URL:http://www.springerlink.com/content/ykd4ex568jnp5nfg/fulltext.pdf.
Matu E et al. "A GFLOPS Vector-DSP for Broadband Wireless Applications" Conference 2006, IEEE Custom Integrated Circuits, IEEE, Piscataway, NJ, U.S. pp. 543-546 Sep. 1, 2006.
Tyler J et al. "AltiVec<TM>: bringing vector technology to the PowerPC<TM> processor family", Performance, computing and communications conference, 1999 ICCC Intern Antional Scottsdale, AZ, USA pp. 437-444 Feb. 10-12, 1999.
"AltiVec TM Technology Programming Interface Manual" Jun. 1, 1999 pp. 130 Retrieved from the internet: URL:http://www.freescale.com/files/32bit/doc/refmanual/ALTIVECPIM.pdf.

* cited by examiner

*Primary Examiner* — Kenneth Kim
(74) *Attorney, Agent, or Firm* — Pearl Cohen Zedek Latzer Baratz LLP (57) ABSTRACT

A device system and method for processing program instructions, for example, to execute intra vector operations. A fetch unit may receive a program instruction defining different operations on data elements stored at the same vector memory address. A processor may include different types of execution units each executing a different one of a predetermined plurality of elemental instructions. Each program instruction may be a combination of one or more of the elemental instructions. The processor may receive a vector of data elements stored non-consecutively at the same vector memory address to be processed by a same one of the elemental instructions and a vector of configuration values independently associated with executing the same elemental instruction on the non-consecutive data elements. At least two configuration values may be different to implement different operations by executing the same elemental instruction using the different configuration values on the vector of non-consecutive data elements.

6 Claims, 3 Drawing Sheets

ON-THE-FLY PERMUTATION OF VECTOR ELEMENTS FOR EXECUTING SUCCESSIVE ELEMENTAL INSTRUCTIONS

BACKGROUND OF EMBODIMENTS OF THE INVENTION

Some embodiments of the present invention relate to processing data stored using a vector architecture and more particularly to a system and method for retrieving permutations of vector memories for executing intra vector operations.

Current computing systems with vector architectures may store a plurality of data elements, in sequential order, at a single memory address. A processor may execute each operation, together, on all elements in a vector memory or segment thereof.

Certain operations, such as vector addition, compose elements from each vector sequentially in the order in which the elements are stored in the vectors and are thus compatible with the storage structure of the vector memories. However, other operations, such as linear combinations, may compose adjacent elements in a vector with different elements. Independently manipulating or executing different operations on each element within a vector memory (at a single address) may be referred to as "intra" vector operations (i.e., independently operating within a vector memory).

Current solutions for executing different operations within a vector memory include rearranging elements in vector memories to align elements to be in the order in which they are to be composed. However, such solutions typically add extra processing steps for rearranging elements and alter the native storage structure of vector memories. Another solution, which maintains the native storage structure of the vector memories, composes every combination of elements to be composed in their vector memories, extracting the necessary products and discarding the rest. This brute-force approach wastes a significant amount of computational resources.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. Specific embodiments of the present invention will be described with reference to the following drawings, wherein:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A vector memory may store a plurality of elements at a single address, for example, so that operations may be executed on all those elements simultaneously or in a single operation. For example, a processor may execute an operation (multiply by integer, b) on each elements of a first memory vector, $a=(a_0, a_1, a_2, a_3)$ at a first memory address to generate a second resultant vector, $b=(a_0 b, a_1 b, a_2 b, a_3 b)$ at a second memory address.

However, some instructions may require consecutive elements from a single vector memory, $\alpha$, to be composed with different operand elements, b, c, d and e, for example, to generate a resultant vector, $(a_0 b, a_1 c, a_{s2} d, a_3 e)$. Since a processor typically manipulates all elements of a vector memory together, the native vector memory structure may preclude such "intra" vector memory operations that apply different operations to different elements within the same vector memory.

To independently manipulate each element $(a_i)$ in a vector memory a while maintaining the native vector memory structure, some conventional systems use a brute-force approach, for example, multiplying vector memory, a, with each of the (4) row vector memories that respectively include elements b, c, d and e. The processor may extract the usable products and discard the rest. For example, to generate the product of row elements $a_1$ and c, the conventional processor may multiply all (4) elements of vector memory a by element c. The processor may then extract the single product, $a_1 c$, which is used to generate resultant vector, $(a_0 b, a_1 c, a_2 d, a_3 e)$, and may discard the remaining products, $a_0 c$, $a_2 c$, and $a_3 c$, which are not. This technique executes unnecessary operations on data elements for which the operations are not intended.

In another conventional system, in order to individually manipulate each of the data elements in a vector memory, a processor may alter the native data structure of the vector memory. In one such system, a processor may store each of the data elements of the vector memory in at a separate register. For example, the (4) elements in the vector a may be separated into (4) vector memories. The number of vector memories further increases as the number of data elements in each vector a increases. This technique uses a large number of vector memories and a correspondingly large number of address resources and extra computational cycles for separately storing the data elements. In another conventional system, a processor may rearrange the elements to store the right operand elements b, c, d and e as consecutive elements in a single vector memory. In addition to the extra computational cycles for rearranging the data elements, altering the native data structure may render the data elements unusable in other operations (for example, vector addition), which rely on the native data structures.

Embodiments of the invention provide a system, method, and processor, to independently manipulate elements at a single vector memory address, without the drawbacks of conventional systems.

Embodiments of the invention may split up or divide instructions into basic or elemental sub-instructions, for example, multiply, add, change sign (+/−) and accumulation of a previous result. Each elemental instruction may be the most basic operation of its type, for example, executable at a single type of execution unit.

A processor may retrieve groups of data elements designated by the original program instruction to be manipulated by each elemental instruction. Each elemental instruction may be executed simultaneously on all such data elements, for example, using a parallel processor, such as, a single instruction multiple data (SIMD) processor. Each retrieved group of data elements may be simultaneously executed using the same elemental instruction (for example, using the SIMD processor) and a different configuration or control value (for example, stored at a secondary configuration vector memory) to implement different operations by the same elemental instructions on two or more of the data elements. Different elemental instructions may be combined and applied successively to each data element to generate the complete original programmed instruction.

Each programmed instruction may be executed as a combination of elemental instruction elements. A processor may activate or deactivate the corresponding execution unit for each elemental instruction in the proper combination and order. For example, to apply the instruction ($x^2-5$) to an element, $(x)=(a_1)$, a multiplication control module may input two copies of operand data element, $(a_1)$, into a multiplier unit to generate $(a_1^2)$, after which a sign control module may input the integer, (5), into a sign change unit to generate (−5), after which an addition control module may input the multiplier and sign change unit outputs, $(a_1^2)$ and (−5), to generate the desired result data, $(a_1^2-5)$.

Embodiments of the invention may use a vector processor with a multi-layer processing core. Each layer of the processor may control a different one of the plurality of elemental instructions and may act as a logical gateway to execute the associated elemental instruction. Together, the layers may operate on pre-designated data elements in a predetermined order to replicate the original program instructions.

A multiplexing or permutation layer may be configured to simultaneously retrieve a plurality of elements from the same vector memory address non-consecutively or out-of-order. In each retrieve cycle, the permutation layer may retrieve the subset of vector elements designated in the program instruction for operation by at least the same elemental instruction. The permutation layer may include a permutation vector or register memory with a sequence of consecutive elements that point to a sequence of non-consecutive elements in the original source vector memory, for example, according to the operations in the program instruction. Although consecutive elements of the permutation vector memory may themselves be retrieved together in a single retrieve cycle, a multiplexer unit may, in turn, simultaneously retrieve the non-consecutive source vector memory elements to which they point. By embedding these pointers in the permutation vector memory, the processor may execute an "on-the-fly" permutation of the original source vector memory to provide non-consecutive vector elements to each execution unit. Each execution unit may simultaneously execute the same type of elemental or sub-instruction on a plurality of (or all) the elements retrieved by the permutation layer. The multiplexer unit may send each element to a combination of one or more execution units, in sequence, which when combined execute the operation of the original program instruction. This "on-the-fly" permutation of elements may enable vector elements, which are conventionally linked at a single memory address, to be separated for independent, e.g., intra vector, manipulation.

One or more execution layers may be configured to execute each elemental or sub-instruction on the elements sent to the corresponding execution unit. Each elemental instruction, for example, add, multiply, conjugate, sign change, etc., may be executed at a single corresponding type of execution unit, for example, an adder unit, a multiplier unit, a conjugation unit, a sign change unit, respectively. A plurality of execution units of the same type may be operated, in parallel, to simultaneously execute the same elemental instruction on all elements in the set of elements retrieved therefore. Some elements may be retrieved by multiple layers and sent to different types execution units (e.g., to apply different types of elemental instructions to an element) or to a single execution unit multiple times (e.g., to multiply an element by itself).

Elements may be queued so that all or a maximum number of execution units are processing data during each computational cycle. The division of instructions into elemental instructions and simultaneous processing thereof may increase efficiency so that data elements may be executed in groups, instead of one at a time. This "least common denominator approach" may decompose relatively complex individual instructions into more basic elemental or sub-instructions common thereto. By decreasing the specificity of instructions, the same elemental instructions apply to more data elements and may be simultaneously executed thereon in larger data groups and with greater efficiency than the original complex instructions.

The execution units of each layer may output sets of elemental output elements (resulting from each type of elemental instruction) which when combined, form the complete resultant data for each element.

An addition or accumulate layer may join corresponding elemental output elements in the combination specified in the original program instruction to generate each complete output element.

Accordingly, embodiments of the invention may execute intra vector operations by using a permutation processing layer of embedded pointers to group non-consecutive vector data elements to be executed in stages for each elemental instruction specified therefore, and then joining the resultant elemental output data elements to generate the complete output data elements.

Figure 1:
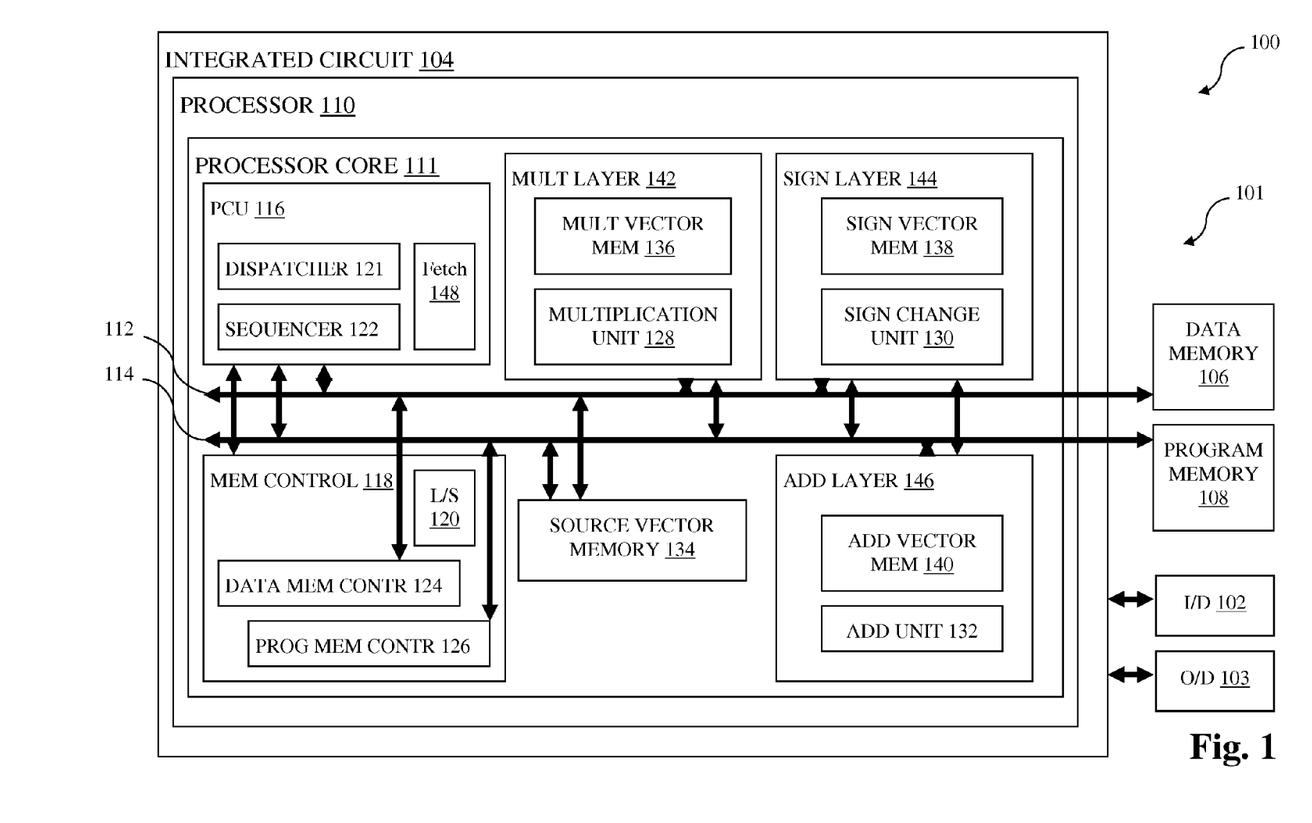
FIG. 1 is a schematic illustration of a system in accordance with embodiments of the invention.

Reference is made to FIG. 1, which schematically illustrates a system 100 in accordance with embodiments of the invention.

System 100 may include a device 101 such as a computer, video or image capture or playback device, cellular device, or any other digital device such as a cellular telephone, personal digital assistant (PDA), video game console, etc. Device 101 may include any device capable of executing a series of instructions to record, save, store, process, edit, display, project, receive, transfer, or otherwise use or manipulate data, such as, video, image, audio, statistical, or other data.

Device 101 may include an input device 102. When device 101 includes recording capabilities, input device 102 may include an imaging device such as a camcorder including an imager, one or more lens(es), prisms, or mirrors, etc., to capture images of physical objects via the reflection of light waves therefrom and/or an audio recording device including an audio recorder, a microphone, etc., to record the projection of sound waves thereto.

Device 101 may include an output device 103 (for example, a monitor, projector, screen, printer, speakers, or display) for displaying data such as video, image, audio, statistical, or other data on a user interface according to a sequence of instructions executed by a processor 110.

Device 101 may include an integrated circuit 104, a data memory 106 and a program memory 108.

Integrated circuit 104 may be an application-specific integrated circuit (ASIC) or any other integrated circuit (IC). Integrated circuit 104 may include a processor 110. Processor 110 may be, for example, a digital signal processor (DSP), a central processing unit (CPU), a microprocessor, a controller, a chip, a microchip, a field-programmable gate array (FPGA), or any other suitable multi-purpose or specific processor or controller.

Processor 110 may be connected to data memory 106 via a data memory bus 112 and to program memory 108 via a program memory bus 114 for transferring data therebetween. Data memory 106 and program memory 108 may include, for example, random access memory (RAM), dynamic RAM (DRAM), flash memory, cache memory, volatile memory, non-volatile memory or other suitable memory units or storage units. Data memory 106 and program memory 108 may be the same memory or separate memories and may be implemented as separate (for example, "off-chip") or integrated (for example, "on-chip") memories.

A processor core 111 may include a program control unit (PCU) 116 and a memory subsystem controller 118. Memory subsystem controller 118 may include a data memory controller 124 connected to data memory bus 112 and a program memory controller 126 connected to program memory bus 114. PCU 116 may include a load/store unit 120 to retrieve a set or "burst" of data elements from data memory 106, for example, consecutively from a single vector memory address in the order in which they are sequentially listed, a dispatcher 121 to pre-decode and dispatch machine language instructions and a sequencer 122 to retrieve the instructions and to control, in general, the pipeline flow of operations or instructions executed on data elements. Memory subsystem controller 118 may include a fetch unit 148 to retrieve instructions, e.g., from program memory 108. Program instructions may designate a specific set of operations to be executed on a specific set of source data elements, e.g., from data memory 106.

Processor core 111 may include a plurality of execution units 128, 130 and 132. Each execution unit 128, 130 and 132 may be associated with a unique one of a set of elemental instructions including, for example, multiplication, addition, sign change (+/−), bit manipulation, arithmetic logic, and general operations. In the example shown in FIG. 1, execution unit 128 is a multiplication unit, execution unit 130 is a sign change unit, and execution unit 132 is an addition unit, although other units and functionalities may be used. Execution units 128, 130 and 132, each executing their respective elemental operation on data, may be applied to the source data, in sequence, to generate the complete original programmed instruction.

The set of source data elements designated by the program instructions for the same elemental instruction may be retrieved, e.g., from data memory 106, and stored in a source vector memory 134. Source vector memory 134 may be any memory with a vector structure, such as, a register file. Source vector memory 134 may be directly accessible to and may transfer data relatively faster to processor core 111 and/or PCU 116, for example, as compared to other memory units in device 101.

Current systems execute the same operation(s) on consecutive data elements retrieved together from a source vector memory. However, the original programmed instruction may specify different operations for these consecutive elements.

Accordingly, instead of inputting consecutive data elements from the source vector memory 134 directly into execution units 128, 130 and 132, embodiments of the invention may include one or more intervening configuration or permutation vector memories 136, 138 and 140. The permutation vector memories 136, 138 and 140 may be used to permute data elements from the source vector memory 134 to be input (for example, in a new non-consecutive order) into execution units 128, 130 and/or 132 of execution layers 142, 144, and 146, respectively. Consecutive elements of each permutation vector memory 136, 138 or 140, may themselves be retrieved together in a single retrieve cycle, but may in turn indicate or point to non-consecutive elements of the source vector memory 134, which may be simultaneously retrieved by a multiplexer. Each intervening vector memory 136, 138 or 140 may provide pointers to elements of the source memory 134 to be executed by a different respective type of execution units 128, 130 and 132 for executing a different or mutually exclusive type of operation on the source data.

In some embodiments, consecutive elements of each intervening vector memory 136, 138 or 140 may point to elements of source vector memory 134 in their original order, though not consecutively. That is, consecutive elements of the intervening vector memory 136, 138 or 140 may skip elements of the source vector memory 134 not designated for the same execution units 128, 130 and 132. In some cases, consecutive elements of intervening vector memory 136, 138 or 140 may point to consecutive source vector elements 134, for example, when the same operation is assigned thereto. In general, consecutive elements of each intervening vector memory 136, 138 or 140 may point to any set or subset of data elements of source vector memory 134 to generate any permutation, group, set or subset, or reordering of the source vector data elements.

In some embodiments, each elemental instruction executed by each execution unit 128, 130 or 132 may be controlled in a separate processing "layer" or a sub-layer. A processing layer or sub-layer may define execution units, storage units and permutation units used to execute the corresponding elemental instruction on data. In the example shown in FIG. 1, layer 142 is a multiplication layer that operates multiplication unit 128 to multiply input data elements, layer 144 is a sign layer that operates sign change unit 130 to change the sign of input data elements, and layer 146 is an addition layer that operates addition unit 132 to add input data elements, although other layers, units and functionalities may be used. Each layer 142-146 may execute its corresponding elemental operation or instruction on the source data elements, which together, cumulatively generate the complete original programmed instruction.

All or many instructions in a set of one or more program instructions may be expressed as a combination of the elemental instructions of layers 142, 144 and 146. For example, executing an exponential operation ($x^n$) may be equivalent to multiplying data (x) by itself (n) times, division may equivalent to multiplication by an inverse value, and subtraction may be equivalent to addition by a negative value of the data. Accordingly, more complex instructions may be reduced to the elemental operations multiplication, addition and sign change, of layers 142, 144 and 146, respectively.

Additional or different elemental operations may be used. For example, when processing complex numbers, a conjugate elemental instruction may be used.

For program instructions that are divided into more than one elemental instruction, the output of one layer may be input into the next successive layer (or the same layer when an operation is repeated). Since basic algebraic operations are generally executed according to an order of operations, for example, multiplication before addition, each layer executing those elemental operations may be applied according to that order. For example, multiplication layer 142 may operate before addition layer 146. Each layer 142-146 may be executed in a separate computational cycle or alternatively, multiple layers may be executed simultaneously, in parallel, or in overlapping or independent time slots, for example, when the order of operations are independent or the output of the operation of higher order is known or predicted. Sign change layer 144 may be executed in between or before multiplication and addition layers 142 and 146.

Layers 142-146 need not operate when their respective functionality is not included in a program instruction. For example, sign change layer 144 may only operate when a sign change is required, for example, applying the negation (−) or opposite of the current sign (+/−) to (−/+), and may be skipped when no sign change is needed. Alternatively, all layers 142-146 are executed for all instructions whether or not the instruction includes the corresponding functionality. In one embodiment, a layer may apply an identity operation (for example, (1) for multiplication, (0) for addition, and (+) for sign change) when the functionality of the layer is not required so that no change is made to the data.

In a demonstrative example, multiplication vector memory 136 may extract (non-consecutive) source data from vector memory 134, which may be input into multiplication unit 128, where the data may (or may not) be multiplied. Intermediate sign vector memory 138 may then extract data output by multiplication unit 128, which may in turn be input into sign change unit 130, where the sign of the data may (or may not) be changed. Intermediate addition vector memory 140 may then extract data output by sign change unit 130, which may in turn be input into addition unit 132, where the data may (or may not) be added to a previous result. The final resulting data may be written back to vector memory 134, or another memory unit in device 101. In other embodiments, one or more of layers 142-146 may be skipped, some layers 142-146 may be used repeatedly or more than once for each input data element, and/or the order in which the layers 142-146 are executed may depend on the types of elemental instructions specified in the program instructions. In one embodiment, processor 110 may generate a queue or sequence of data elements for each execution layer 142-146 and the corresponding execution unit 128-132 may execute its elemental instruction on the data next-in-line when the unit is empty.

Once each layer 142-146 applies the corresponding elemental instruction to the proper input data elements, in the proper combination and order, the resultant data may be equivalent to the desired operation by the complete original programmed instruction.

In some embodiments of the invention, the actual program instructions themselves may be divided into groups or families of elemental instructions, for example, multiply/accumulate (MAC) instructions, add/subtract instructions, sign change/conjugate instructions, etc. Processor 110 or PCU 116 may automatically divide the program instructions into the corresponding elemental instructions, for example, prior to running the operations or in "real-time," for example, in the instruction decoding stage.

Pre-designated instruction fields may activate or deactivate the one or more layers 142-146 and one or more corresponding devices 128-132 for executing each elemental instruction. For example, each elemental instruction may include a field for permutations, the value of which may indicate if a permutation of data elements is required (field=1) or not (field=0) and/or in which order the data elements are to be used. A field value indicating that a permutation is required may cause processor 110 to queue the permutation elemental instruction for a multiplexer. The permutation layer may retrieve data elements out of order from vector memory 134 according to the permutation elemental instruction, for example, using an intermediate permutation vector memory. Similarly, each instruction may include a field for each type of execution unit (or family of elemental instructions). A field value of (0) may indicate the instruction does not include the associated elemental instruction and need not be operated on by the execution unit associated with that field, while a field value of (1) may indicate the instruction does include the associated elemental instruction and may be queued for execution by the associated execution unit. Accordingly, each layer 142-146 may be activated by a corresponding (for example, single bit) field in the instructions.

Figure 2:
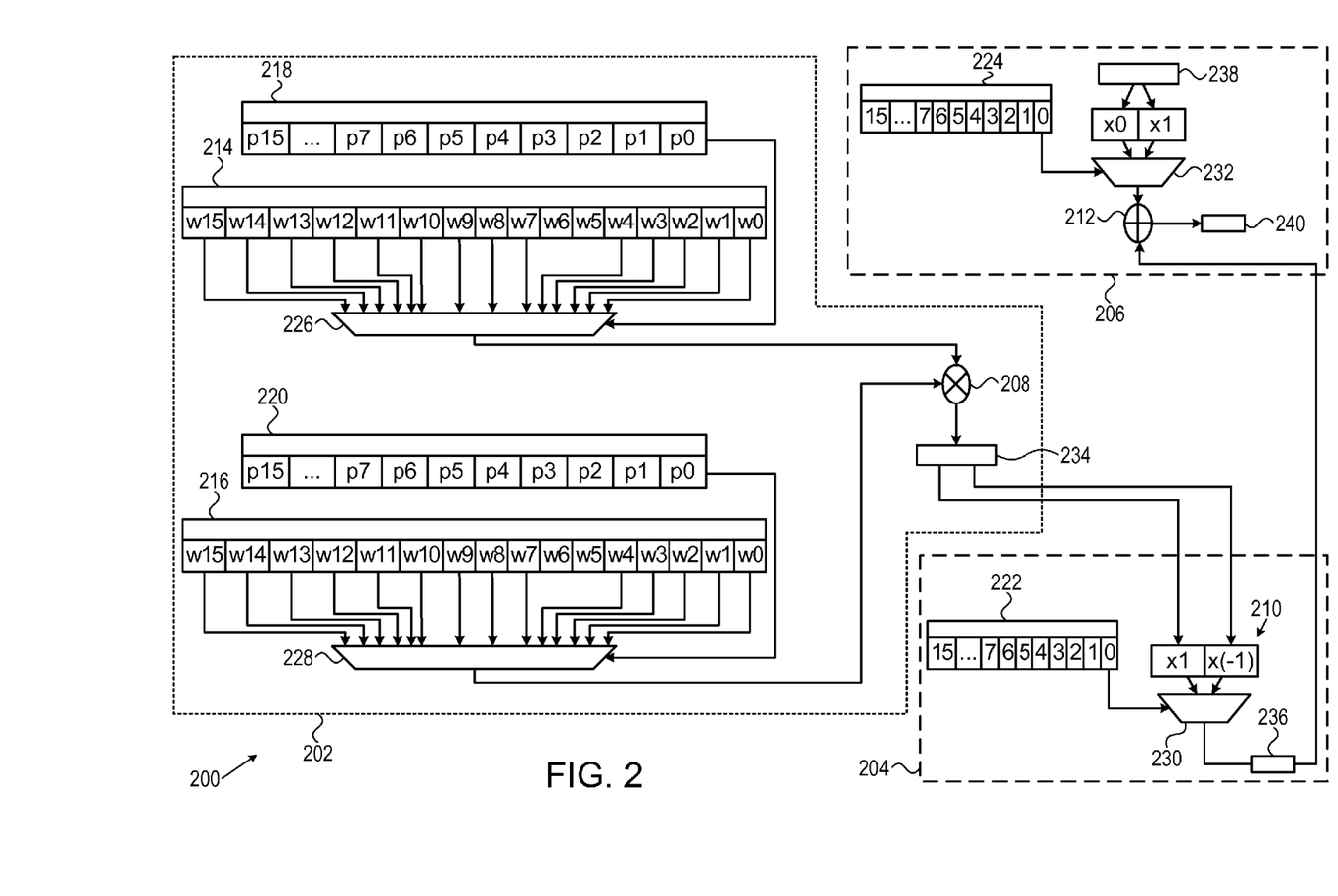
FIG. 2 is a schematic illustration of the processing architecture of the system of FIG. 1 in accordance with embodiments of the invention.

Reference is made to FIG. 2, which schematically illustrates the processing architecture of the system of FIG. 1 in accordance with embodiments of the invention.

System 200 includes a plurality of processing layers 202, 204 and 206. Each layer 202-206 controls the operation of a different or mutually exclusive type of execution unit 208, 210 and 212, respectively, and may be solely responsible for executing a different elemental instruction in a device processor core (e.g., processor core 111 of FIG. 1). In the example shown in FIG. 2, execution unit 208 is a multiplication unit for multiplying data elements, execution unit 210 is a sign change unit for changing the sign of data elements, execution unit 212 is an addition unit for adding data elements to resultant data elements, for example, generated by other execution units 208 and 210. Other execution units and/or associated elemental instructions may be used.

Each layer 202-206 may apply the associated type of elemental instruction to input data element(s), for example, multiplication, sign change, and/or addition, which in the proper combination and order, are cumulatively equivalent to original programmed instructions.

The source data elements may be stored in source vector memories 214 and 216. Each layer may retrieve source data element from the source vector memories 214 and 216 or intermediate result vector memories 234, 236 and/or 238 storing resultant data output from the previous layer in the chain of execution. In one embodiment, only the first layer (for example, multiplication layer 202 or another layer first to operate on the data) may retrieve data element from the original source vector memories 214 and 216.

Since source vector memories 214 and 216 have a vector memory structure, a conventional processor may only operate on elements in the memory together, as a group, applying the same operations to all the vector elements (w0)-(w15). According to embodiments of the invention, to execute intra-vector operations (for example, different operations for different data elements at the same memory address location), one or more configuration vector memories 218, 220, 222 and/or 224 may be used to selectively retrieve data elements in a specified configuration from the input data vector memories (for example, vector memories 214, 216, 234, 236 and/or 238).

Configuration vector memories 218 and 220 may be configured to retrieve elements in a non-consecutive order, for example, from source vector memories 214 and 216. Configuration vector memories 218 and 220 may each include a sequence of consecutive data elements (p0)-(p15), which may be joined and operated on together at the same memory address, but which in turn indicate a set of non-consecutive data elements in source vector memories 214 and 216 (for example, (w0), (w1), (w4), (w9), . . . ). This way, a processor executing configuration vector memories 218 and 220 may cause one or more multiplexer(s) 226 and 228 to simultaneously retrieve the indicated set of non-consecutive data elements from vector memories 214 and 216. Accordingly, each configuration vector memory 218 and 220 extracts and rearranges data elements from source vector memories 214 and 216 in an order to combine elements pre-designated for the elemental instruction (for example, multiplication) associated with layer 202. Multiplication unit 208 may multiply each pair of elements (wi) and (wj) in vector memories 214 and 216 pointed to by pairs of elements (pi) in configuration vector memories 218 and 220, where pointer elements (pi) have the same index, (i)=(0), . . . , (15), and at least one pair of the data elements (wi) and (wj) have different indices (i)≈(j)=(0), . . . , (15). In one example, each data element (pi) of configuration vector memories 218 and 220 may be (4) bits, for example, to indicate the (16) different potential values from (0) to (15) corresponding to the (16) indices of elements in each of source vector memories 214 and 216, respectively. Accordingly, each of configuration vector memories 218 and 220 may be, for example, (64) bits, and each of source vector memories 214 and 216 may be, for example, (256) bits. Other numbers of bits, data elements and vector memories 214, 216, 218 and 220 may be used. Layer 202 may output multiplication result vector memory 234 to the next successive layer 204.

In sign change layer 204, a sequence of consecutive data elements (0)-(15) of configuration vector memory 222 may indicate the sign of, for example, each product of data elements (wi)*(wj) in the multiplication result vector memory 234. For example, if both multiplied elements (wi) and (wj) from source vector memories 214 and 216 have the same (positive or negative) sign, the corresponding product in multiplication result vector memory 234 will be positive and if the multiplied elements (wi) or (wj) have different signs, the corresponding product in multiplication result vector memory 234 will be negative. A single bit (for example, (0)=negative; (1)=positive) may indicate the sign of the multiplication result of each pair of elements multiplied in multiplication layer 202. Accordingly, configuration vector memory 222 may be, for example, (16) bits to indicate the sign of all (16) products in multiplication result vector memory 234. Sign change unit 210 may use a multiplexer 230 to apply (or not apply) a sign change to each of the (16) elements of multiplication result vector memory 234 to generate signed multiplication result vector memory 236. Sign change layer 204 may output signed multiplication result vector memory 236 to the next successive layer 206.

Addition or accumulation layer 206 may accumulate values from the signed multiplication result vector memory 236 to generate a final result vector memory 240. Accumulation layer 206 may add current values to previously generated values, for example, from a previously executed program instruction. Configuration vector memory 224 may include a sequence of consecutive data elements (0)-(15) to indicate whether or not to add the current signed multiplication result vector memory 236 to the previous signed multiplication result 238. Configuration vector memory 224 may use a single bit (for example, (0)=do not add; (1)=add) for each element in the sequence of (16) consecutive data elements (0)-(15) of signed multiplication result 236, for example, generating a total configuration vector memory 224 size of (16) bits. In another embodiment, configuration vector memory 224 may be a permutation vector memory including embedded pointers to indicate non-consecutive elements of signed multiplication result 238 to add to the current product. In such embodiments, each element of the permutation vector memory may be (4) bits to point to any of the (16) previously generated elements of signed multiplication result 238. Adder unit 212 may use a multiplexer 232 to add (or not add) the current data element of signed multiplication result vector memory 236 to the corresponding previous signed multiplication result vector memory 238 for each of the (16) elements thereof to generate final result vector memory 240. Layer 206 may output final result vector memory 240.

Each (16:1) multiplexer 226 and 228 shown in FIG. 2 may be configured to control the order of each set of (16) data elements of each source vector memory 214 and 216, respectively. However, each single execution unit 208-212 and (2:1) multiplexer 230 and 232 may only be configured to control a single data element from the respective input vector memories. Accordingly, layers 202-206 may use a plurality (16) of each of execution units 208-212 and (2:1) multiplexers 230 and 232 that are shown in FIG. 2. In one embodiment, each layer 202-206 may execute the plurality of execution units and/or multiplexers in parallel using a single instruction multiple data (SIMD) architecture.

Although in the example in FIG. 2, multiplication layer 202 is responsible for reordering data elements from source vector memories 214 and 216, alternatively, the configuration vector memories 222 and 224 in other layers 204 and 206 may include embedded pointers (e.g., 4 bits each) for on-the-fly permutations of input vector elements. In other embodiments, configuration vector memories for retrieving data elements non-consecutively may be part of an additional permutation layer separate from execution layers 202-206.

In some examples, the same data element may be retrieved by multiple configuration vector memories 218, 220, 222 and/or 224 in more than one of layers 202-206 for simultaneous applying different elemental instructions using multiple types of execution units 208-212, respectively. For example, a program instruction (3x-x) may cause both configuration vector memories 218 or 220 and 222 to retrieve data element (x) for multiplication by (3) and changing the sign to (−), respectively.

Once the data elements are input into their corresponding execution units 208, 210 and/or 212, the units may execute the associated elemental instructions on the data elements in the proper order to generate the desired data elements of final result vector memory 240. Data elements of final result vector memory 240 may be stored, transferred, further processed or output by device 101.

Configuration vector memories 218, 220, 222 and/or 224 of FIG. 2 may be implemented by dedicated configuration instructions. For example, configuration instructions (CFG0) and (CFG1) may control configuration vector memories 218 and 220 to store consecutive elements thereof pointing to non-consecutive elements of source vector memories 214 and 216, respectively. Configuration instruction (CFG2) may control configuration vector memory 222 to store the sign of the product of each pair of elements indicated in (CFG0) and (CFG1). Configuration instruction (CFG3) may control configuration vector memory 224 to store a field indicating whether or not to add the current product to a previously generated product. In an example, a processor (e.g., processor 110 of FIG. 1) may execute the following configuration instructions:

CFG0
p0=12
p1=5
CFG1
p0=0
p1=3
CFG2
bit0=0 (negate)
bit1=1 (leave)
CFG3
bit0=1 (accumulate)
bit1=0 (don't accumulate)

These configuration instructions include field values (p0) and (p1) for CFG0 to indicate the left operand element input into a first and second execution units, respectively; field values (p0) and (p1) for CFG1 to indicate the right operand element input into a first and second execution units, respectively, (bit0) for CFG2 to indicate a sign change operation (=0) (or alternatively no sign change (=1)) for the first input data element; (bit1) for CFG2 to indicate no sign change operation (=1) (or alternatively a sign change (=0)) for the second input data element; (bit0) for CFG3 to indicate adding the input value to the previous input value (=1) (or alternatively not adding (=0)) for the first input data element; (bit1) for CFG3 to indicate not adding the input value to the previous input value (=0) (or alternatively adding (=1)) for the second input data element. These input parameters executed by these instructions may result in the following operations executed by system 200:

First Operation:
PREV_RESULT+(−1)×(SRC_A_W12×SRC_B_W0)→FINAL_RESULT;

Second Operation:
(SRC_A_W5×SRC_B_W3)→FINAL_RESULT,
where SRC_A defines the address for source vector memory 214 and SRC_B defines the address for source vector memory 216.

Other configuration instructions include field values may be used.

An advantage of using a vector architecture to store and process data as vectors may be that all data elements in each vector may be manipulated together to increase processing efficiency. However, when data elements within a vector require independent manipulation, current systems fail.

To independently manipulate each element within a vector or the same vector memory address, embodiments of the invention may use one or more configuration vector memories 218, 220, 222, 224, which may independently modify the same elemental or sub-instruction executed on each data element. Therefore, each elemental instruction executed on a vector of data elements may be configured to execute an independent operation on each of the data elements in the vector for intra vector operations. Furthermore, each data element may undergo a unique or independently designated sequence of different elemental instructions. For example, each element may be grouped with other non-consecutive data elements executed by the same elemental instruction. Groupings non-consecutive data elements may ensure that the proper sequence of elemental instructions are executed on each data element (e.g., regardless of neighboring or consecutive elements), which when combined form the complete original program instruction. Accordingly, different elemental instruction and different operations for each elemental instruction may be specified by configuration values individually for each data elements stored at the same source vector memory to implement "intra" vector operations.

Figure 3:
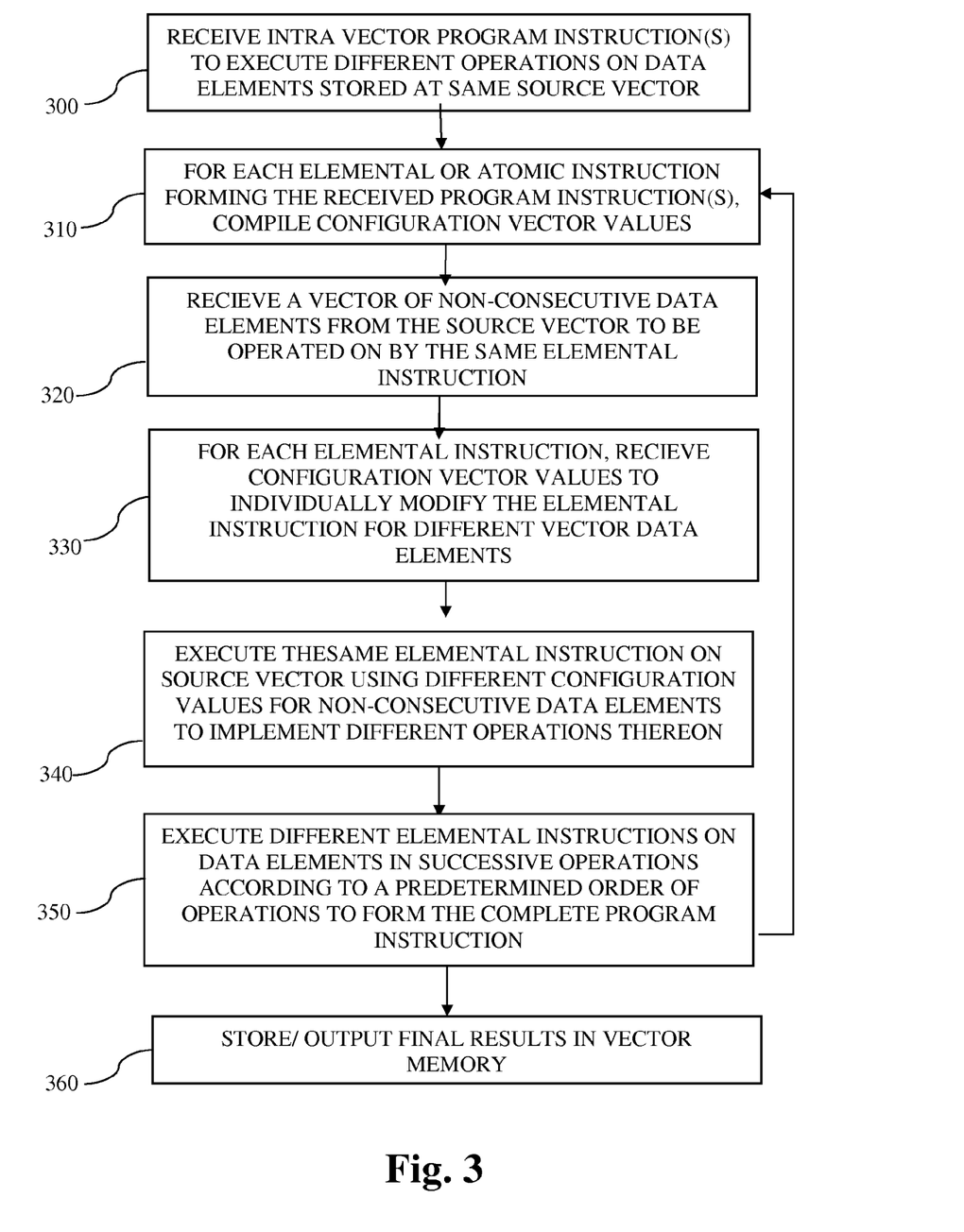
FIG. 3 is a flowchart of a method in accordance with embodiments of the invention.

Reference is made to FIG. 3, which is a flowchart of a method in accordance with embodiments of the invention.

In operation 300, a fetch unit (for example, fetch unit 148 in PCU 116 of FIG. 1) may receive one or more (for example, "intra vector") program instructions from a program memory (for example, program memory 108 of FIG. 1) to execute different operations on data elements stored at the same source vector memory address (for example, vector memory 134 of FIG. 1). Each source vector memory may store data elements such that a plurality of data elements may only be directly retrieved consecutively in each retrieve operation, for example, by a single load/store unit (e.g., load/store unit 120 of FIG. 1).

Each program instruction may be a combination of one or more of a predetermined plurality of elemental instructions each executable at a different type of execution unit (for example, execution units 128, 130, and 132). The predetermined elemental or sub-instructions may be the most basic operations, for example, including multiplication/division, addition/subtraction, sign change/conjugation, and accumulate with a previous result. The elemental instructions may be combined to generate more complex program (for example, arithmetic) instructions.

In operation 310, for each elemental instruction forming the one or more program instructions, a processor (for example, processor 110 of FIG. 1) may compile configuration values into a configuration vector memory (e.g., vector memories 136, 138 and/or 140 of FIG. 1). The configuration values for each elemental instruction may be independently associated with each of the data elements to independently operate the elemental instruction on the elements stored at the same vector memory address. The processor may load configuration values into the permutation and/or other configuration vector memories or registers (for example, multiplication, sign change and addition vector memories 136, 138, 140). The configuration values may be retrieved from a data memory (for example, from data memory 106 by load/store unit 120 of FIG. 1) or from a program memory (for example, from program memory 108 by fetch unit 148 of FIG. 1).

In operation 320, a load/store unit (load/store unit 120 of FIG. 1) may receive a vector of non-consecutive data elements from the same source vector memory address of a data memory (for example, data memory 106 of FIG. 1). The data elements may be designated to be operated on by the same elemental instruction, for example, as defined by the original program instruction. Retrieving may itself be an elemental instruction (for example, executable at a single type of execution unit, a load/store unit). In one embodiment, the configuration vector memory may permute the retrieved source data elements. For example, consecutive values of the configuration vector memory may point to non-consecutive data elements stored at the same source vector memory address. The fetch unit may operate the same retrieve elemental instruction simultaneously for a vector of the consecutive values of the configuration vector memory to indirectly retrieve the plurality of non-consecutive data elements of the source vector memory (for example, using multiplexer 226 of FIG. 2). In some embodiments, retrieving non-consecutive data elements may include initially retrieving the data elements consecutively and then permuting the elements into a non-consecutive order. Non-consecutive data elements may include some permuted and some non-permuted data element, but at least two data elements may be in different positions than the positions in which they are originally stored in source vector memory.

In operation 330, the processor may receive a vector of configuration values from the configuration vector memory for executing individual operations on the retrieved non-consecutive data elements from the source vector memory. The configuration values, independently associated with each of the retrieved non-consecutive data elements, may include at least two different values. The different configuration values may define different operations for the same elemental instruction for the corresponding at least two non-consecutive data elements in the retrieved vector.

In operation 340, the processor may execute the same elemental instruction on the vector of data elements using the at least two different configuration values for at least two of the non-consecutive data elements to implement different operations thereon. Accordingly, different elements in a single vector may be independently manipulated by a single elemental instruction.

In operation 350, the processor may execute different elemental instructions on the data elements, in successive operations, at the corresponding different types of execution units. A process may repeat operations 310-340 for each different one of the predetermined plurality of elemental instructions, for example, multiply, sign change, add and accumulate with a previous result, using one or more separate configuration vector memories or registers for each different elemental instruction. The different elemental instructions may be executed on each data element according to a predetermined order of operations, for example, multiplication before sign change, sign change before addition, and addition before accumulation with a previous result. The different elemental instructions may combine, for example, according to the predetermined order of operations, to form the complete original program instruction for each data element.

In operation 360, the processor may store the final results of the combined one or more elemental instructions executed on each data element in a vector memory. When the data elements represent image or video data, such as pixel values, a digital image represented by the final vector memory products may be displayed on a monitor or screen (for example, output device 103 of FIG. 1). When the data elements represent audio data, a sound file including portion represented by the final vector memory products may be played on a speaker or digital instrument.

In some embodiments, the processor may initially compile configuration memories and then, for example, in a separate processing stage, execute the program instructions according to the compiled memories. In the program compilation phase, the processor may load configuration values into the configuration register, for example, from data memory 106 or directly by programmer via the program memory 108. In one embodiment, the loaded configuration values may include pointers to non-consecutive elements of source vector memory 134 to enable permutation of the data stored therein. In the execution phase, one or more program instructions may indicate an address in the configuration memories and the processor may look up configuration values at that address and execute the instructions accordingly.

Other operations or series of operations may be used.

Instead of conventional processors splitting up or rearranging vector data elements to independently execute different instructions thereon, embodiments of the invention may split up the instructions into different elemental or sub-instructions, and execute a unique combination of the elemental instructions equivalent to each unique original programmed instruction.

Embodiments of the invention may be software-implemented, for example, using dedicated configuration instruction(s) for each execution unit (e.g., execution units 208, 210 and 212 of FIG. 2) or, alternatively, hardware-implemented using a dedicated configuration control modules, for example, to map non-consecutive data elements from 214 and 216 to execution units 208, 210 and/or 212 of FIG. 2.

It may be appreciated by a person skilled in the art that although embodiments of the invention are described may be used in reference to any data including video or image data, audio data, graphic data, multimedia data, statistical data, or any one or more dimensional data.

Embodiments of the invention may include an article such as a computer or processor readable medium, or a computer or processor storage medium, such as for example a memory, a disk drive, or a USB flash memory, for encoding, including or storing instructions which when executed by a processor or controller (for example, processor 1 of FIG. 1), carry out methods disclosed herein.

Although the particular embodiments shown and described above will prove to be useful for the many distribution systems to which the present invention pertains, further modifications of the present invention will occur to persons skilled in the art. All such modifications are deemed to be within the scope and spirit of the present invention as defined by the appended claims.

The invention claimed is:

1. A method comprising:
at a first stage:
  loading, from a data memory into a configuration vector memory within a processor configuration values, pointers to non-consecutive elements of data elements, stored at a source vector memory within the processor to be used for executing a program instruction;
  wherein the program instruction is a combination of two or more of predetermined elemental instructions, each elemental instruction executable at a different type of execution unit within the processor; and
at a second stage:
  executing the elemental instructions of the program instruction in successive operations, wherein executing a first elemental instruction comprises:
    using a first portion of the configuration values stored at the configuration vector memory to permute on-the-fly data elements in the source vector memory such that non-consecutive data elements are input to a first-type execution unit;
    executing the first elemental instruction in the first-type execution unit according to the first portion of the configuration values; and
    outputting the result of the first-type execution unit to a first-result vector memory, which serves as a source vector register for a second-type execution unit which executes a second successive elemental instruction;
  executing the second elemental instruction in the second-type execution unit according to a second portion of the configuration values stored at a second configuration vector memory and values stored at the first-result vector memory; and
outputting the result of the second-type execution unit to a second-result vector memory,
wherein each type of execution unit comprises parallel execution units to execute the corresponding elemental instruction in parallel.

2. The method of claim 1 further comprising:
executing a third elemental instruction in a third-type execution unit according to a third portion of the configuration values stored at a third configuration vector memory and values stored at the second-result vector memory, which serves as a source vector register for the third-type execution unit; and outputting the result of the third-type execution unit to a third-result vector memory.

3. The method of claim 1, wherein the predetermined elemental instructions comprise multiplication/division, addition/subtraction, sign change/conjugation and accumulation of a previous result.

4. The method of claim 1, comprising simultaneously executing the first elemental instruction on the plurality of non-consecutive data elements retrieved in the single retrieve operation.

5. A system comprising:

a data memory; and a processor connected to the data memory via a data memory bus, wherein the processor comprises a source vector memory and different types of execution units, each configured to execute a respective elemental instruction, wherein a configuration vector memory within the processor is configured to receive from the data memory, configuration values including pointers to non-consecutive elements of data elements stored at the source vector memory to be used for executing a program instruction, which is a combination of two or more of predetermined elemental instructions, each executable at one of the execution units, wherein the processor is configured to execute elemental instructions of the program instruction in successive operations, wherein executing a first elemental instruction comprises:

using a first portion of the configuration values stored at the configuration vector memory to permute on-the-fly data elements in the source vector memory such that non-consecutive data elements are input to a first-type execution unit;

executing the first elemental instruction in the first-type execution unit according to the first portion of the configuration values; and outputting the result of the first-type execution unit to a first-result vector memory, which serves as a source vector register for a second-type execution unit which executes a successive elemental instruction, and executing the second elemental instruction in the second-type execution unit using a second portion of the configuration values stored at a second configuration vector memory and values stored at the first-result vector memory and outputting the result of the second-type execution unit to a second-result vector memory, wherein each type of execution unit comprises parallel execution units to execute the corresponding elemental instruction in parallel.

6. The system of claim 5, wherein each of the parallel execution units of the same type executes the same elemental instruction using a single instruction multiple data (SIMD) architecture.

* * * * *